United States Patent Office 3,410,342
Patented Nov. 12, 1968

3,410,342
WATERFLOOD EMPLOYING NONIONIC SURFACTANT AND ORGANIC STABILIZING AGENT
Milton K. Abdo, Dallas, Tex., assignor to Mobil Oil Corporation, a corporation of New York
No Drawing. Filed June 7, 1967, Ser. No. 644,123
17 Claims. (Cl. 166—9)

ABSTRACT OF THE DISCLOSURE

This specification discloses a method of recovering oil from a subterranean formation employing flooding water containing a nonionic surfactant to lower the interfacial tension between the flooding water and the oil and containing an organic stabilizing agent. The nonionic surfactant is an alkyl phenol oxypoly(ethoxy)ethanol in which the alkyl group contains 8 to 9 carbon atoms, inclusive, and the poly(ethoxy) group contains 5 to 14 ethylene oxide groups, inclusive. The organic stabilizing agent is sparingly soluble in water and preferentially soluble in hydrocarbons. It is preferably an alcohol containing from 5 to 13 carbon atoms, inclusive, or an aromatic hydrocarbon such as benzene or toluene. Further, both an alcohol and an aromatic hydrocarbon may be employed as the stabilizing agent.

BACKGROUND OF THE INVENTION

1. Field of the invention

This invention pertains to a method of recovering petroleum from a subterranean formation. More specifically, this invention pertains to a method of recovering petroleum from a subterranean formation by flowing into the formation an aqueous flooding liquid containing additives.

2. Description of the prior art

The petroleum, more commonly called crude oil or simply oil, accumulated in subterranean formations is recovered or produced therefrom through wells completed in the subterranean formation. A large amount of the oil is left in the formation if produced only by primary depletion, that is, where only initial formation energy is used to recover the oil. Where the initial formation energy is inadequate or has become depleted, supplemental operations, often referred to as secondary recovery operations, are employed. In the most successful and most widely used of these operations, a fluid is injected through injection means, comprising one or more wells, and passed into the formation. Oil is displaced within and is moved through the formation, and is produced from production means, comprising one or more wells, as the injected fluid passes from the injection means toward the production means. In a particular recovery operation of this sort, water is employed as the injected fluid and the operation is referred to as a waterflood. The injected water is referred to as the flooding water, as distinguished from the in-situ, or connate, water.

Waterflooding is a very useful method of recovering oil from a subterranean formation. Although the flooding water flows through as large a portion of the subterranean formation as any other displacing fluid, it often has a relatively low microscopic displacement efficiency. Microscopic displacement efficiency is defined as the ratio of the oil displaced from the interstices of the portion of the formation through which the flooding water has passed to the amount of oil originally contained therein. The relatively low microscopic displacement efficiency is caused by relatively high interfacial tension and unfavorable contact angles between the flooding water and the in-situ oil.

To improve the microscopic displacement efficiency of oil by the flooding water, it has been suggested that a surfactant be added to the flooding water to decrease the interfacial tension and to alter favorably the contact angle. Specific patents, such as U.S. 3,126,952, Waterflooding Method, issued Mar. 31, 1964, to Lloyd W. Jones, describe incorporating an alcohol and a surfactant into a slug of a soluble oil injected into the formation ahead of the flooding water. Employing oil as the flooding liquid is much more expensive than water. Furthermore, the flooding water breaks through the slug of injected oil and contacts the in-situ oil, effecting high interfacial tension and unfavorable contact angles again. Applicant's invention employs an economical aqueous flooding liquid which is miscibly displaced by the flooding water, effecting low interfacial tension and favorable contact angles.

SUMMARY OF THE INVENTION

The invention is an improvement in a method of recovering oil from a subterranean formation having injection means and production means completed therein in which a fluid is injected through the injection means and into the formation, and oil is produced from the formation through the production means to the surface of the earth. The improvement comprises (a) injecting a slug of flooding water (1) containing from about 0.05 to about 0.5 percent by weight of a surfactant, the surfactant being an alkyl phenol oxypoly(ethoxy)ethanol in which the alkyl group contains 8 to 9 carbon atoms, inclusive, and the poly(ethoxy) group contains from about 5 to about 14 ethylene oxide groups, inclusive, and (2) containing at least 0.001 percent by weight and no more than a saturation concentration of a stabilizing agent sparingly soluble in water and preferentially soluble in hydrocarbons, the stabilizing agent being either an alcohol containing 5 to 13 carbon atoms, inclusive, or an aromatic hydrocarbon, or both; and (b) driving said slug of flooding water into said formation with a driving fluid. By the procedure of the invention, the injected fluid flows through the same relatively large portion of the formation as a waterflood but effects a greater microscopic displacement of the oil than a waterflood.

DESCRIPTION OF SPECIFIC EMBODIMENT

Waterflooding is well known, therefore a detailed description of the known steps involved is believed unnecessary. The steps are described or inferred in such well-known references as Primer of Oil and Gas Production, American Petroleum Institute, Division of Production, Dallas, Tex., published by American Petroleum Institute, New York, N.Y. (1954), and Petroleum Production Engineering, Oil Field Exploitation, L. C. Uren, Third Edition, McGraw-Hill Book Company, Inc. (1953). Conventional mixing equipment, storage tanks, pumps, and piping are employed in incorporating surfactant and stabilizing agent into the flooding water, and injecting the resulting mixture into the injection means. Conventional production equipment such as water knockouts, oil and gas separators, emulsion breaking equipment, storage tanks, pipeline, and pumping equipment is employed in producing the oil.

The stabilizing agents are sparingly soluble in water.

They are soluble in the flooding water containing the nonionic surfactant at about 25° C., in an amount of from about 0.001 to about 0.7 percent by weight in the flooding water containing the nonionic surfactant. In this connection, the nonionic surfactant in the flooding water acts as a hydrotrope to increase the solubility of the stabilizing agent. The preferred alcohol stabilizing agents are those containing from 6 to 9 carbon atoms, inclusive. The most preferred alcohols are those containing 8 carbon atoms. Illustrative of the most preferred alcohols is 2-ethylhexanol. Two or more alcohols can be employed together. Illustrative of the aromatic hydrocarbon stabilizing agents that can be employed are benzene, toluene, and xylene. Of these aromatic hydrocarbons, benzene and toluene are preferred. Similarly to the alcohols, two or more of the aromatic hydrocarbons may be employed together.

Particularly effective results are obtained by employing flooding water containing the nonionic surfactant and containing both an alcohol and an aromatic hydrocarbon as stabilizing agent. Two or more alcohols and two or more aromatic hydrocarbons can be employed together. It appears that there is an interrelationship between the nonionic surfactant, the alcohol, and the aromatic compound which enhances the effect of each, achieving a wider region of mutual miscibility with the oil, the stabilizing agents, and the nonionic surfactant which effects more nearly complete microscopic displacement of the oil and increases the amount of oil ultimately recoverable. For example, a slug of flooding water containing the nonionic surfactant, 2-ethylhexanol and benzene is particularly effective in recovering oil.

While the invention is not to be bound by the consequences of any theory, it is theorized that the stabilizing agent disolves the film which is ordinarily formed at the interfacial boundary between the flooding water containing the surfactant and the oil within the formation and enables the flooding water containing the nonioic surfactant to penetrate more readily into the restricted interstices in the subterranean formation, flushing the oil therefrom to a greater extent than is otherwise obtainable.

It is preferred that the nonionic surfactant be employed in an amount such that the interfacial tension of the flooding water will be less than 0.5 dyne per centimeter. Ordinarily, a concentration of at least 0.05 percent by weight of the nonionic surfactant will be required in the flooding water to effect this desirably low interfacial tension. Preferably, a concentration of from about 0.1 to about 0.3 percent by weight of the nonionic surfactant is employed in the flooding water. Higher concentrations, for example, 0.5 percent by weight of the nonionic surfactant, may be employed. However, more than 0.5 percent by weight of the nonionic surfactant may not be emonomically feasible since the increased amount of surfactants may cost more than the additional oil recovered.

To be effective in stabilizing the flooding water containing the nonionic surfactant, the stabilizing agent must be present in a concentration of at least 0.001 percent by weight of the flooding water. However, the stabilizing agent should not be present in a concentration greater than the saturation concentration at the temperature of the subterranean formation. Stated otherwise, the stabilizing agent should not be used in an amount greater than will dissolve in the flooding water containing the nonionic surfactant. For example, in subterranean formations having a temperature of about 25° C., the concentration of stabilizing agent will be no more than about 0.7 percent by weight when the saturation concentration is about 0.7 percent by weight.

Where a formation is to be treated by injecting flooding water into the formation, the particular additive system, defined as the nonionic surfactant or surfactants and the stabilizing agent or agents employed, may be incorporated in only a portion of the flooding water to create a slug or slugs thereof. Each slug should have a volume of at least 0.1 percent but preferably at least 1 percent of the pore volume of the formation. Where only one slug is employed, it may have a volume of 0.1 to 20 percent of the pore volume of the formation. Where more than one slug is employed, the total volume of the slugs may be from 0.2 to 20 percent of the pore volume of the formation.

The slug of flooding water containing the nonionic surfactant and the stabilizing agent is injected through the injection means and passed into the formation. It may be driven into the formation by injecting therebehind a driving fluid such as water or natural gas. Where multiple slugs of the flooding water are employed, a volume of driving fluid, preferably having at least the same volume as the slug, is injected between the slugs. In this latter case, it is preferred that the driving fluid be untreated flooding water, i.e., flooding water not containing surfactant or stabilizing agent. Instead of untreated flooding water, flooding water containing a lower concentration of nonionic surfactant may be employed between alternate slugs of flooding water containing the additive system.

The amount of oil recovered by the flooding operation carried out in accordance with the invention may be increased by the injection of from about 0.5 to 10 percent pore volume of a slug of oil containing from 1 to 10 percent by weight of a stabilizing agent immediately in advance of the flooding water containing the additive system.

The following example will be illustrative of the invention. In this example, laboratory models were constructed to simulate a subterranean formation. Yates sand of the Kermit Field, Winkler County, Tex., was employed in construction of the models. Yates sand contains about 5 percent dolomite and 16 percent other clay which is a regularly interstratified calcium-montmorillonite-chlorite mixture. The models had a diameter of 0.595 inch, a length of 22 inches, a porosity of 41.02 percent, a pore volume of 41.1 cubic centimeters (cc.), and a specific permeability of a 1 percent sodium chloride solution of 577 millidarcies (md). The models were saturated with water. The water was in turn displaced by flowing Yates crude oil through the models until no more water was produced therefrom. The Yates crude oil had a viscosity of 4.4 centipoises. The initial oil saturation was 62.44 percent of the pore volume. To simulate a waterflood, untreated flooding water was flowed through the models until no more oil was being produced. The final oil saturation at the end of the waterflood was 23.45 percent of the pore volume. Thus, the waterflood recovered about 62 percent of the original oil in place. This waterflood was employed as the standard against which to compare the results obtained thereafter.

A second run was performed on the Yates crude oil in one of laboratory models. Prior to the introduction of the flooding water, 0.07 pore volume of Yates oil containing 10 percent nonyl phenol oxyocta(ethoxy)ethanol was injected into the model. This was followed by flooding water containing 0.2 percent by weight of the nonyl phenol oxyocta(ethoxy)ethanol and 1 percent by weight sodium chloride. The ultimate oil recovered when no more oil was being produced in the effluent stream was about 70 percent of the original oil in place.

A third run was made on the Yates crude oil in one of the laboratory models to demonstrate the increased recovery obtainable by employing flooding water containing both the nonionic surfactant and the stabilizing agent in a flooding operation similar to the second run in which only the nonionic surfactant was employed in the flooding water.

In this run, a slug of 0.07 pore volume of oil containing 10 percent 2-ethylhexanol was injected ahead of the treated flooding water. The flooding water next injected was treated by adding 0.2 percent by weight of nonyl phenol oxyocta(ethoxy)ethanol, 1 percent by weight sodium chloride, and 0.03 percent 2-ethylhexanol. The model was flooded until no more oil was being produced in the effluent stream. About 92 percent of the original oil in place was recovered. The table summarizes the results obtained.

TABLE

|   | Volume percent of oil in place recovered |
|---|---|
| (1) Normal waterflood | 62 |
| (2) Water containing 0.2 percent by weight nonyl phenol oxyocta(ethoxy)ethanol and 1.0 percent sodium chloride [1] | 70 |
| (3) Water containing 0.2 percent by weight nonyl phenol oxyocta(ethoxy)ethanol, 1.0 percent sodium chloride, and .03 percent 2-ethylhexanol [2] | 92 |

[1] Prior to flooding, .07 pore volume of oil containing 10 percent nonyl phenol oxyocta(ethoxy)ethanol was injected.
[2] Prior to flooding, .07 pore volume of oil containing 10 percent 2-ethylhexanol was injected.

Having thus described the invention, it will be understood that such description has been given by way of illustration and example and not by way of limitation. The appended claims define the scope of the invention.

What is claimed is:

1. In a method of recovering oil from a subterranean formation having injection means and production means completed therein in which a fluid is injected through said injection means and into said formation and oil is produced from said formation through said production means to the surface of the earth, the improvement comprising:
   (a) injecting into said formation through at least one injection well a slug of flooding water
      (1) containing from about 0.05 to about 0.5 percent by weight of a nonionic surfactant which is an alkyl phenol oxypoly(ethoxy)ethanol in which the alkyl group contains 8 to 9 carbon atoms and the poly(ethoxy) group contains from about 5 to about 14 ethylene oxide groups, and
      (2) containing at least 0.001 percent by weight and no more than the saturation concentration of a stabilizing agent which is either an alcohol containing 5 to 13 carbon atoms, inclusive, or an aromatic hydrocarbon, or both; and
   (b) driving said slug of flooding water into said formation with a driving fluid.

2. The method of claim 1 wherein said stabilizing agent is an alcohol containing from 5 to 13 carbon atoms, inclusive.

3. The method of claim 2 wherein said alcohol contains 6 to 9 carbon atoms.

4. The method of claim 3 wherein said alcohol contains 8 carbon atoms.

5. The method of claim 4 wherein said alcohol is 2-ethylhexanol.

6. The method of claim 1 wherein said stabilizing agent is an aromatic hydrocarbon.

7. The method of claim 6 wherein said aromatic hydrocarbon is either benzene, toluene, or xylene, or a mixture thereof.

8. The method of claim 7 wherein said aromatic hydrocarbon is benzene.

9. The method of claim 1 wherein said stabilizing agent is both an alcohol containing 5 to 13 carbon atoms and an aromatic hydrocarbon.

10. The method of claim 9 wherein said stabilizing agent is 2-ethylhexanol and benzene.

11. The method of claim 1 wherein said slug of flooding water has a volume of from .1 to about 20 percent of the pore volume of said formation.

12. The method of claim 11 wherein said slug of said flooding water has a volume of from about 1 to about 10 percent of the pore volume of said formation.

13. The method of claim 1 wherein said driving fluid is water.

14. The method of claim 1 wherein said driving fluid is natural gas.

15. The method of claim 1 wherein said slug of said flooding water is injected alternately with said slugs of at least equal volume of said driving fluid.

16. The method of claim 1 wherein a slug of oil containing said stabilizing agent is injected through said injection means and into said formation immediately in front of said slug of said flooding water containing said nonionic surfactant and containing said stabilizing agent.

17. The method of claim 16 wherein said slug of oil containing said stabilizing agent is injected in a volume of from about 0.5 to about 10 percent of said pore volume of said information.

References Cited

UNITED STATES PATENTS

| 3,082,822 | 3/1963 | Holm et al. | 166—9 |
| 3,096,820 | 7/1963 | Bernard | 166—9 |
| 3,126,952 | 3/1964 | Jones | 166—9 |
| 3,131,759 | 5/1964 | Slusser et al. | 166—2 |
| 3,181,609 | 5/1965 | Csaszar et al. | 166—9 |
| 3,236,303 | 2/1966 | Csaszar | 166—9 |
| 3,333,634 | 8/1967 | Townsend et al. | 166—9 |
| 3,346,047 | 10/1967 | Townsend et al. | 166—9 |

STEPHEN J. NOVOSAD, *Primary Examiner.*